United States Patent
Westernacher et al.

(10) Patent No.: US 6,218,502 B1
(45) Date of Patent: Apr. 17, 2001

(54) COPOLYCARBONATES WITH AN INDANE BISPHENOL BASE

(75) Inventors: Stefan Westernacher, Seabrook, TX (US); Annett König, Krefeld (DE); Jürgen Stebani, Krefeld (DE); Friedrich-Karl Bruder, Krefeld (DE); Wilfried Haese, Odenthal (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/463,720
(22) PCT Filed: Jul. 21, 1998
(86) PCT No.: PCT/EP98/04541
  § 371 Date: Feb. 28, 2000
  § 102(e) Date: Feb. 28, 2000
(87) PCT Pub. No.: WO99/06464
  PCT Pub. Date: Feb. 11, 1999

(30) Foreign Application Priority Data

Aug. 2, 1997 (DE) .............................. 197 33 570

(51) Int. Cl.[7] .................................................... C08G 64/00
(52) U.S. Cl. ........................................... 528/196; 528/198
(58) Field of Search ...................... 528/196, 198

(56) References Cited

FOREIGN PATENT DOCUMENTS

| 621297 | 10/1994 | (EP) . |
| 2347395 | * 11/1977 | (FR) . |
| WO99/06464 | * 2/1999 | (WO) . |

* cited by examiner

Primary Examiner—Terressa M. Boykin
(74) Attorney, Agent, or Firm—Joseph C. Gil; Aron Preis

(57) ABSTRACT

A copolycarbonate having glass transition temperature not higher than 160° C. and a rheooptic constant not higher than 4 is disclosed. Containing structural units conforming to

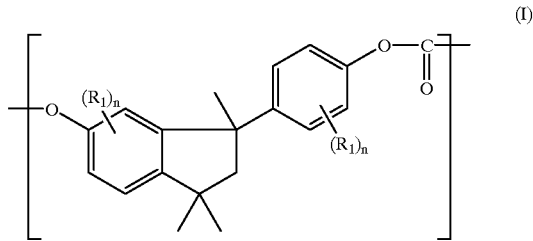

(I)

wherein the radicals $R_1$ each independently denotes a $C_{1-12}$-alkyl radical or a halogen atom and n is 0 to 3, the copolycarbonate is suitable for the preparation of lenses and optical mass storage means.

14 Claims, No Drawings

COPOLYCARBONATES WITH AN INDANE BISPHENOL BASE

The present invention relates to novel copolycarbonates having a glass transition temperature $T_G$ of $\leq 160°$ C. and a rheooptic constant $C_R \leq |4|*GPa^{-1}$, containing as repeating, difunctional carbonate structural units A) at least one of the carbonate structural units of formula (1)

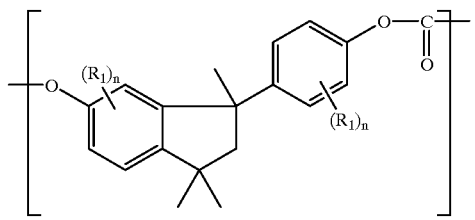

wherein
the radicals $R_1$ each independently of the other(s) represents a $C_1$–$C_{12}$-alkyl radical, preferably a $C_1$–$C_3$-alkyl radical, especially a methyl radical, or a halogen atom, preferably chlorine or bromine, and
n represents an integer from 0 to 3, preferably 0,
and
B) at least one of the other carbonate structural units, which are different from A, of formula (II)

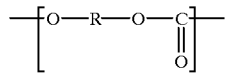

wherein the radical —O—R—O— represents any desired diphenolate radicals, in which —R— is an aromatic radical having from 6 to 40 carbon atoms which may contain one or more aromatic or condensed aromatic nuclei optionally containing hetero atoms and which may optionally be substituted by $C_1$–$C_{12}$-alkyl radicals or by halogen and which may contain aliphatic radicals, cycloaliphatic radicals, aromatic nuclei or hetero atoms as bridge members, which, as respective homopolycarbonates from carbonate structural units of formula (II), have a glass transition temperature $T_G$ of $\leq 160°$ C. and a rheooptic constant $C_R \leq |4|*GPa^{-1}$.

The present invention relates also to the use of those copolycarbonates in the production of optical articles.

For the storage of optical information on optical data carriers or compact disks, which may be readable and re-recordable many times, such mass storage means must exhibit not only adequate transmission of the light in the appropriate wave range and excellent optical homogeneity, that is to say minimal double refraction, but also good mechanical load carrying ability.

Japanese Offenlegungsschrift No. Sho 61-148 401 discloses polycarbonates based on indane bisphenol which may optionally contain up to 95 mol % of other aromatic difunctional carbonate structural units. As compared with optical articles of, for example, acrylate resins, optical articles made from specially constructed copolycarbonates have a lower double refraction, lower moisture absorption and better heat resistance. Those known copolycarbonates do not satisfy the increased requirements, especially in respect of double refraction, processability and transmission.

The object of the present invention was, therefore, to make available copolycarbonates which satisfy the high requirements made of modem optical data carriers, especially optical mass storage means.

That is achieved according to the invention by providing copolycarbonates having a glass transition temperature $T_G$ of $\leq 160°$ C. and a rheooptic constant $C_R23 |4|*GPa^{-1}$, containing as repeating, difunctional carbonate structural units A) at least one of the carbonate structural units of formula (I)

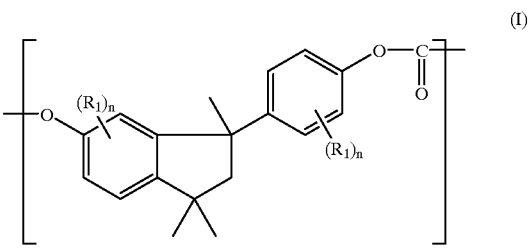

wherein
the radicals $R_1$ and n are as defined above,
and
B) at least one of the other difunctional carbonate structural units, which are different from A, of formula (II)

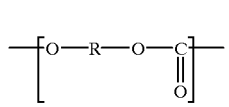

wherein the radical —O—R—O— represents any desired diphenolate radicals, of which —R— is an aromatic radical having from 6 to 40 carbon atoms which may contain one or more aromatic or condensed aromatic nuclei optionally containing hetero atoms and which may optionally be substituted by $C_1$–$C_{12}$-alkyl radicals or by halogen and which may contain aliphatic radicals, cycloaliphatic radicals, aromatic nuclei or hetero atoms as bridge members, and
which, as respective homopolycarbonates from carbonate structural units of formula (II), have a glass transition temperature $T_G$ of $\leq 160°$ C., preferably $\leq 130°$ C., and a rheooptic constant $C_R \leq |4|*GPa^{-1}$, preferably $\leq |3|*GPa^{-1}$ Preferred copolycarbonates according to the invention are those containing from 5 to 50 mol %, preferably from 10 to 40 mol %, especially from 20 to 30 mol %, based on 100 mol % of the difunctional carbonate structural units A and B, of difunctional carbonate structural units B.

The difunctional carbonate structural units of formula (I) are derived from indane bisphenols, the preparation of which is known from the literature. For example, indane bisphenol has hitherto been prepared from isopropenylphenol or its dimer in the presence of a Friedel-Crafts catalyst, such as, for example, boron trifluoride, iron(III) chloride, aluminium oxide, aluminium trichloride, halocarboxylic acids or carboxylic acids, in organic solvents (U.S. Pat. No. 3,288,864, JP-A 60035150, U.S. Pat. No. 4,334,106). Indane bisphenols having a high degree of purity are suitable especially for the preparation of the copolycarbonates according to the invention.

The difunctional carbonate structural units B are derived from diphenol compounds which lead to homopolycarbonates having a rheooptic constant $C_R \leq |4|*\text{GPa}^{-1}$, preferably $\leq |3|*\text{GPa}^{-1}$, especially $\leq |2|*\text{GPa}^{-1}$, determined as indicated hereinbelow.

Those corresponding homopolycarbonates are additionally distinguished by a glass transition temperature $T_G$ of $\leq 160°$ C., preferably $\leq 130°$ C., measured in accordance with standard CEI/IEC 1074.

The difunctional carbonate structural units B are preferably derived from aromatic diphenols, such as 4,4'-(m-phenylenediisopropylidene)-diphenol (bisphenol M).

Mixtures of the diphenols may also be used for the preparation of the difunctional carbonate structural units B.

The preparation of the copolycarbonates according to the invention can be carried out, for example, in accordance with the three known methods (see H. Schnell, "Chemistry and Physics of Polycarbonates", Polymerreview, Volume IX, page 27 ff, Interscience Publishers, New York 1964, and DE-A 1 495 626, DE-A 2 232 877, DE-A 2 703 376, DE-A 2 714 544, DE-A 3 000 610, DE-A 3 832 396):

1. In accordance with the solution process in disperse phase, so-called "two-phase phase interface process":
   In that process, the diphenols to be used are dissolved in an aqueous alkaline phase. There are optionally added thereto the chain terminators required for the preparation of the copolycarbonates according to the invention, in amounts of from 1.0 to 20.0 mol %, based on moles of diphenol, dissolved in an aqueous alkaline phase, preferably sodium hydroxide solution, or in an inert organic phase, without solvent. The mixture is then reacted with phosgene in the presence of an inert organic phase which is preferably a solvent for polycarbonate. The reaction temperature is from 0° C. to 50° C.

The addition of the required chain terminators and branching agents may also be carried out during the phosgenation or, provided that chlorocarbonic acid esters are present in the synthesis mixture, without solvent, as a melt, as a solution in alkali or inert organic solvents. The reaction may be accelerated by means of catalysts such as tertiary amines or onium salts. Tributylamine, triethylamine and N-ethylpiperidine are preferred.

In addition to or instead of the diphenols, their chlorocarbonic acid esters and/or bischlorocarbonic acid esters may be employed or metered in during the synthesis.

Suitable solvents are, for example, methylene chloride, chlorobenzene, toluene and mixtures thereof.

2. In accordance with the solution process in homogeneous phase, also called the "pyridine process":
   In that process, the diphenols are dissolved in organic bases such as pyridine, optionally with the addition of further organic solvents, and then, as described under 1, the chain terminators and branching agents required for the preparation of the polycarbonates according to the invention are optionally added.

The mixture is subsequently reacted with phosgene. The reaction temperature is preferably from 10° C. to 50° C. Suitable organic bases, in addition to pyridine, are, for example, triethylamine, tributylamine, N-ethylpiperidine, and also N,N-dialkyl-substituted anilines, such as N,N-dimethylaniline. Suitable solvents are, for example, methylene chloride, chlorobenzene, toluene, tetrahydrofuran, 1,3-dioxolane and mixtures thereof.

In addition to the diphenols, up to 50 mol %, based on the phenols used, of their bischlorocarbonic acid esters may also be employed.

Isolation of the polycarbonates according to the invention is carried out in a known manner in processes 1 and 2. Suitable methods of working up are especially precipitation, spray drying and evaporation of the solvent in vacuo.

3. In accordance with the melt transesterification process
   In the melt transesterification process, the molecular weight is condensed with the addition of diphenyl carbonate in stoichiometric amounts or in an excess of up to 40%, with continuous removal of phenol and, optionally, of the diphenyl carbonate excess by distillation. The process is carried out using conventional catalysts, such as alkali metal ions, for example Li, Na, K, transition metal compounds, for example those based on Sn, Zn, Ti, or nitrogen and phosphorus bases, preferably ammonium and phosphonium salts, especially phosphonium halides or phenolates, as a single-stage or two-stage process, that is to say with optional separate condensation of the oligomers and of the polymer.

In a known manner, chain terminators and/or branching agents for the preparation of the copolycarbonates according to the invention can be used concomitantly. The corresponding chain terminators and/or branching agents are known inter alia from EP-A 335 214 and DE-A 3 007 934 and EP-A 411 433 and DE-A 4 335 440, respectively.

The copolycarbonates according to the invention have a glass transition temperature $T_G$ of $\leq 160°$ C., preferably $\leq 150°$ C., especially $\leq 130°$ C., and a rheooptic constant $C_R \leq |4|*\text{GPa}^{-1}$, preferably $\leq |3|*\text{GPa}^{-1}$, especially $\leq |2|*\text{GPa}^{-1}$.

The thermoplastic copolycarbonates according to the invention have molecular weights $M_W$ (weight average, determined by gel chromatography after previous calibration) of at least 9000, preferably from 9000 to 30,000, especially from 10,000 to 20,000.

On account of their low rheooptic constant, but also their very low yellowness index $Y_1 \leq 2$—which gives transmission at a high level—and their very good processing properties, the copolycarbonates according to the invention are suitable especially for the production of optical articles, such as lenses, prisms, optical data carriers, compact disks, but especially for the production of optical data carriers, which are readable and re-recordable many times, for the storage of optical information (mass storage means).

The yellowness index is measured using a 4 mm thick injection moulded plate in accordance with standard ASTM E 313/96.

For that purpose in particular, the copolycarbonates according to the invention must have a high degree of purity. That is achieved by reducing the content of residual monomers, solvent, foreign particles (of inorganic or organic nature, especially salts and dust) and chlorine in a known manner to the lowest possible values during working up and isolation, in accordance with, for example, the teaching of EP-A 380 002.

The present invention therefore relates also to the use of the copolycarbonates according to the invention, or of the corresponding moulding compositions, in the production of optical articles, and to the corresponding optical articles produced from the copolycarbonates according to the invention.

To that end there may be added to the copolyearbonates according to the invention, or to the corresponding moulding compositions, provided that it is permissible for the intended applications according to the invention, before, during and after their processing, the additives conventionally employed for thermoplastic polycarbonates, such as stabilisers, optical brightening agents, flameproofing agents, mould-release agents, flow auxiliaries, in customary amounts, as are described, for example, in EP-A 213 413.

The moulded bodies according to the invention may be produced by the usual methods, especially injection moulding or extrusion.

EXAMPLES

In the following Examples and Comparison Examples, the rheooptic constant, the molecular weight and the glass transition temperature are determined as follows:

Double refraction in injection moulded bodies, one of the most important optical properties, can be described as a material property by the rheooptic constant. That may be positive or negative. The greater its absolute value, the greater the double refraction in injection moulded mouldings. The method of measuring the rheooptic constant is known (EP-A-0 621 297, page 4, lines 36 to 45). The plane-parallel, 150 to 1000 micrometer thick specimens required therefor can be prepared by melt compression moulding or film casting.

Determination of the molecular weight is carried out by measuring the relative viscosities at 25° C. in methylene chloride and at a concentration of 0.5 g per 100 ml of methylene chloride.

The $T_G$ was determined in accordance with standard CEI/IEC 1074.

Examples and Comparison Examples

The following poly(co)carbonates were prepared:

TABLE 1

| Example | Bisphenol A (g) | Indane bisphenol (g) | Bisphenol M (g) |
|---|---|---|---|
| 1 | 0 | 43.8 | 26.0 |
| Comparison 2 | 0 | 0 | 43.3 |
| Comparison 3 | 57.1 | 0 | 0 |

In accordance with the amounts given in Table 1, bisphenol A, bisphenol M or indane bisphenol and bisphenol M are dissolved with 22.0 g of NaOH and 800 g of water, under an inert gas, with stirring. 600 ml of methylene chloride are then added thereto.

49.5 g of phosgene were introduced into the thoroughly stirred solution at from 20 to 25° C. at a rate of approximately 2 g/minute, the pH value being maintained at from 11 to 14 by the subsequent metering in of a 45 % aqueous sodium hydroxide solution. p-Tert-butylphenol was then added in such an amount (approximately 2 g) that a solution viscosity in the end product of approximately 1.2 was achieved. 0.35 ml of N-ethylpiperidine was also added, and stirring was continued for a further 45 minutes. The bisphenolate-free solution was separated off and, after acidification, the organic phase was washed with water until neutral and freed of solvent.

The resulting polycarbonates have the following properties indicated in Table 2:

TABLE 2

| Example | Glass temperature (° C.) | Rheooptic constant (1/GPa) | Relative solution viscosity |
|---|---|---|---|
| 1 | 147 | 2.2 | 1.209 |
| Comparison 2 | 100 | 3.2 | 1.202 |
| Comparison 3 | 145 | 5.4 | 1.208 |

What is claimed is:

1. A copolycarbonate comprising repeating difunctional structural units conforming to

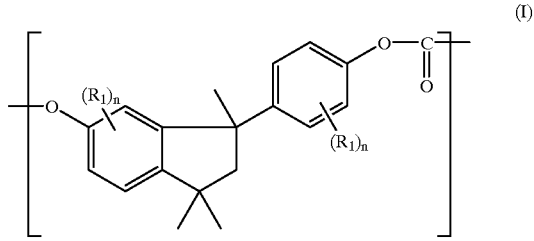

(I)

wherein $R_1$ each independently denotes a $C_{1-12}$-alkyl radical or a halogen atom and n is an integer of 0, and

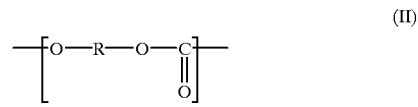

(II)

wherein R is an aromatic radical having 6 to 40 carbon atoms, with the proviso that the glass transition temperature of a homopolycarbonate based on II) is not higher than 160° C. and the rheooptic constant of said homopolycarbonate is not greater than $|4|*Gpa^{-1}$.

2. The copolycarbonate of claim 1 wherein R contains one or more aromatic or condensed aromatic nuclei.

3. The copolycarbonate of claim 2 wherein said nuclei contain heteroatoms.

4. The copolycarbonate of claim 3 wherein nuclei is substituted by at least one $C_{1-12}$-alkyl radical or by halogen.

5. The copolycarbonate of claim 1 wherein said glass transition temperature is not higher than 130° C. and said rheooptic constant is not greater than $|3|*Gpa^{-1}$.

6. The copolycarbonate of claim 1 characterized in having a glass transition temperature not higher than 160° C. and rheooptic constant not greater than $|4|*Gpa^{-1}$.

7. The copolycarbonate of claim 1 characterized in having a glass transition temperature not higher than 150° C. and rheooptic constant not greater than $|3|*Gpa^{-1}$.

8. The copolycarbonate of claim 1 wherein structural units II) are derived from 4,4'-(m-phenylenediisopropylidene)-diphenol.

9. The copolycarbonate of claim 1 wherein structural units II) are present in an amount of 5 to 50 mol % relative to the total of I) and II).

10. The copolycarbonate of claim 1 characterized in having weight average molecular weight of 9000 to 30000.

11. A molding composition comprising the copolycarbonate of claim 1.

12. The molding composition of claim 11 characterized in having a yellowness index smaller than 2.

13. An optical lens comprising the composition of claim 11.

14. An optical mass storage mean comprising the composition of claim 11.

* * * * *